(12) United States Patent
Ploesser et al.

(10) Patent No.: US 8,069,434 B2
(45) Date of Patent: Nov. 29, 2011

(54) INTEGRATED MODEL CHECKING AND ISSUE RESOLUTION FRAMEWORK

(75) Inventors: Karsten Ploesser, Teneriffe (AU); Franz Weber, Wiesloch (DE); Joerg Mann, Heidelberg (DE)

(73) Assignee: SAP AG, Walldorf (DE)

( * ) Notice: Subject to any disclaimer, the term of this patent is extended or adjusted under 35 U.S.C. 154(b) by 1065 days.

(21) Appl. No.: 11/927,131

(22) Filed: Oct. 29, 2007

(65) Prior Publication Data

US 2009/0113380 A1    Apr. 30, 2009

(51) Int. Cl.
*G06F 9/44* (2006.01)
(52) U.S. Cl. .......................................... 717/104
(58) Field of Classification Search ........................ None
See application file for complete search history.

(56) References Cited

U.S. PATENT DOCUMENTS

| | | | |
|---|---|---|---|
| 2004/0199572 A1* | 10/2004 | Hunt et al. | 709/201 |
| 2005/0166167 A1* | 7/2005 | Ivancic et al. | 716/5 |
| 2006/0282806 A1* | 12/2006 | Cadambi et al. | 716/5 |
| 2007/0250811 A1* | 10/2007 | Ahs et al. | 717/114 |

* cited by examiner

*Primary Examiner* — Philip Wang
(74) *Attorney, Agent, or Firm* — Mintz, Levin, Cohn, Ferris, Glovsky and Popeo, P.C.

(57) ABSTRACT

A plurality of constraints are identified for a model of a software deployment in an integrated development environment. Each of the constraints are associated with one of a plurality of analysis levels. It is determined for each analysis level whether the corresponding associated constraints are met so that an identification indicating the same may be provided. Related techniques, apparatus, systems, and articles are described.

20 Claims, 6 Drawing Sheets

INTEGRATED MODEL CHECKING AND ISSUE RESOLUTION FRAMEWORK

TECHNICAL FIELD

The subject matter described herein relates to an architecture for integrated model checking that includes a troubleshooting framework.

BACKGROUND

Large software deployments are increasingly being modeled prior to initiation of coding. Model checking ensures that model artifacts satisfy a set of criteria when models pass to the next level of maturity. Such criteria can include the correctness and plausibility of artifacts as well as infrastructure-related issues that take into consideration the underlying technical infrastructure (e.g., availability, adequateness of configuration, etc.). Constraints associated with a check define what criteria an artifact has to satisfy in order to pass a check. Constraints can be repeatedly applied to artifacts without changing the artifact as such. Given an identical context, constraints should return a predictable result. Conventional architectures for model checking require improvements in efficiency, error reporting, and troubleshooting assistance.

SUMMARY

In one aspect, a plurality of constraints for a model of a software deployment in an integrated development environment are identified. These constraints are associated with one of a plurality of analysis levels. It is then determined, for each analysis level, whether the corresponding associated constraints are met. The model can be identified as having met the constraints if it is determined that the corresponding associated constraints are met for each analysis level. Optionally, the model can be identified as not having met the constraints if it is determined that at least one of the corresponding associated constraints is not met for each analysis level.

Numerous variations may be implemented depending on the desired configuration. For example, each analysis level in which at least one of the corresponding associated constraints is not met can be identified. Specific constraints that are not met can be identified. Constraints that are not met can be associated with constraint violation severity levels which are also identified. Visual representation can be provided that suggests a resolution to allow the constraint to be met.

The analysis levels can comprise, for example, syntactical analysis, static semantic analysis, dynamic semantic analysis, plausibility analysis, and/or conceptual analysis.

The corresponding associated constraints are met for each analysis level are initiated when a model revision checkpoint occurs. Such a checkpoint can be associated with a transition from a first model state to a second model state. The constraints can define constraints of one or more elements of a domain metamodel.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current subject matter provides an arrangement in which a user can easily identify whether certain aspects of a model are accurate prior to transition to the next maturity level of the model. In addition, a user can be presented with various options to help facilitate resolution of any outstanding issues.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
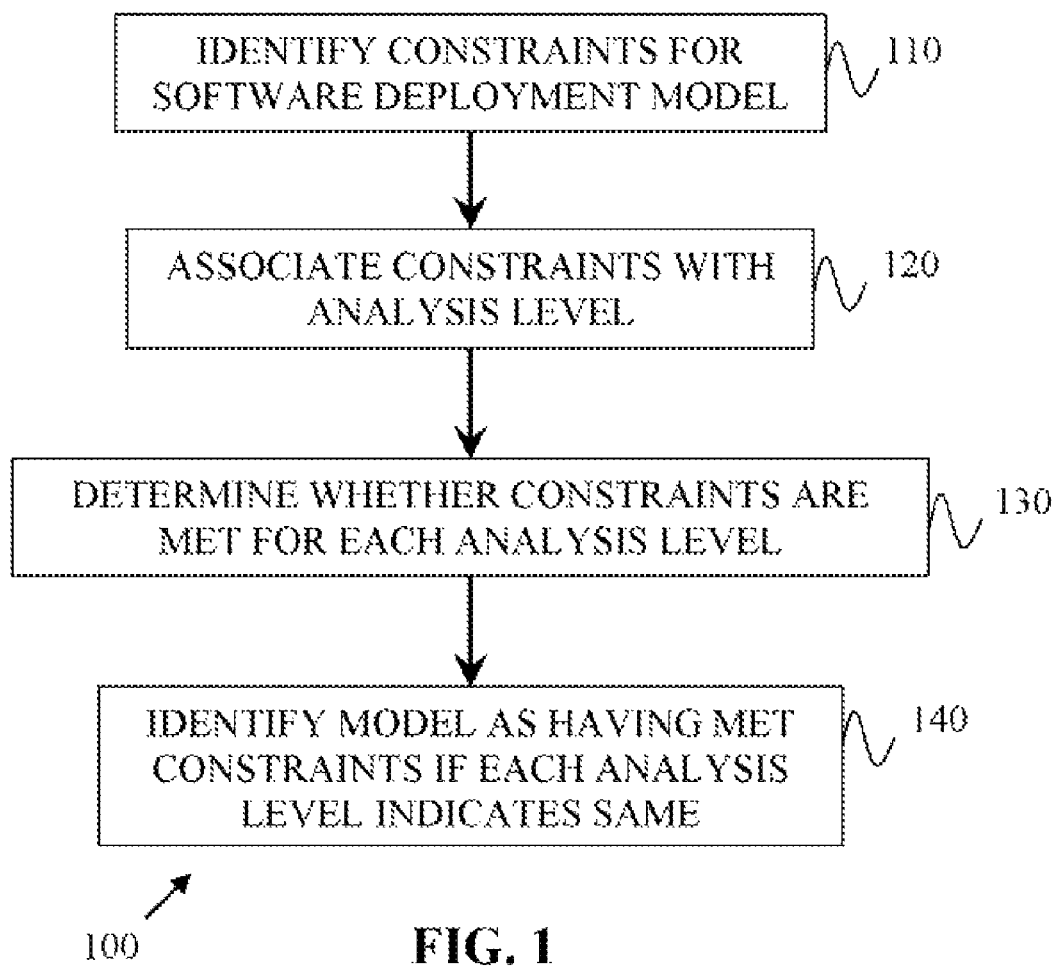
FIG. 1 is a process flow diagram illustrating a distributed scoring technique in which variables are generated by a plurality of data sources.

Model analysis (or model checking) can be characterized as the process of automatically checking a model against its constraints. Constraints can be applied to specific aspects of a model and are associated with certain points in time of its lifecycle. The current subject matter uses analysis levels to distinguish between such aspects. A model can be considered consistent with a given level if it satisfies the constraints of that level.

Metamodels define a vocabulary alongside a set of production rules according to which concrete models can be composed. The production rules impose syntactical constraints on utterances. A model is valid if and only if it fully satisfies these constraints.

Semantic constraints can enforce compliance of concrete models with the execution semantics of the metamodel domain. A model can be considered executable if and only if it fully satisfies these constraints. Due to the dynamic and in some cases unpredictable nature of model execution, constraints can be split into two classes.

On the one hand, constraints can be identified that can be statically analyzed, i.e. without making any assumptions whatsoever on the path of execution. On the other hand, constraints can be identified which can only be determined dynamically, i.e. by making explicit assumptions about the path of execution.

A model that is syntactically and semantically correct may however not be plausible for every situation. Plausibility constraints outline whether a model represents an optimal, efficient solution to a given problem. Unlike the constraints introduced so far, plausibility cannot be ultimately determined. Plausibility constraints can only give guidelines on how to improve a model, as there is typically more than just one possible solution.

A model that is both plausible and correct may on the other hand not fulfill its originally intended purpose. Such issues typically arise when a model does not adequately map concepts of a higher-level specification (e.g. a business requirement) into elements of the domain language it is based on. Such a phenomenon can be referred to as the conceptual gap between the model and its higher-level specification. Constraints at this level are potentially ambiguous. Human intervention can be required when making inferences based on conceptual constraints.

TABLE 1

Model Analysis Levels

| Analysis Level | Description |
|---|---|
| Syntactical Analysis | Detects violations of the grammatical rules as specified by the domain metamodel. Example. Missing attributes or invalid cardinalities |
| Static Semantic Analysis | Detects semantic issues that can be deduced without making assumptions about the execution path. Example. Type checking, variable initialization issues |
| Dynamic Semantic Analysis | Detects semantic issues that can only be deduced by symbolic execution of the model. Example. Parallelism issues such as deadlocks, lifelocks, starvation |
| Plausibility Analysis | Detects plausibility issues of a given model. Example. Anti patterns, enforcement of best practices |
| Conceptual Analysis | Detects conceptual issues, i.e. gaps between high-level specification and model realization. Example. A model does not fully fulfill its business purpose, i.e. it fails to deliver on its goals. |

The kind of constraints analyzed on each level of the model analysis process may differ greatly. It may thus necessary to distinguish between such kinds of constraints by introducing the notion of classes of constraints.

The constraints of a check pertain to a specific class of constraints. The attribute Class expresses that relation. The class of constraint can be used to deduce the severity of constraint violation.

Violations of constraints entrain consequences which are of different severity. An example of severity classification is provided below in Table 1. This classification consistently describes the severity level and consequences of constraint violation.

TABLE 1

Constraint Violation Severity Levels

| Severity Level | Description |
|---|---|
| Info | The model checker informs the user about a potential to improve the current model. |
| Warning | The model checker issues a warning in case a model or one of its parts may potentially violate a constraint. A warning requests the user to act. The model is considered potentially inconsistent. |
| Error | The model checker issues an error in case a violation of a constraint was detected. The model is considered inconsistent. Upstream lifecycle transitions are prohibited. |

Violations of constraints can be detected during the process of model checking. The model checker analyzes different types of constraints in each phase of the process. Table 2 provided below relates types of constraints to the resulting severities in case of violation.

TABLE 2

Constraints Types and Severity

| Violation of . . . | | Typically Results to Severity Level . . . |
|---|---|---|
| Syntactical Constraints | Error | In most cases |
| Static Semantic Constraints | Error | In most cases |
| | Warning | E.g. in case of type casting issues that may fail at runtime |
| Dynamic Semantic Constraints | Warning | In most cases |
| Plausibility Constraints | Info | In most cases |
| | Warning | E.g. if usage of a particularly harmful anti pattern is identified |
| Conceptual Constraints | Info | In most cases |
| | Warning | E.g. if an explicit violation of the higher-level specification was identified |

Performing checks on a model results in a list of problem descriptions in case any constraints were violated. In order to better structure this result and indicate consequences, the following attribute can be introduced to document the severity associated to a check: the attribute severity describes the severity of violating constraints specified by a check.

Over the course of modeling, certain versions of a model will be created and subsequently modified. Such versions can be referred to as the revisions of a model. Model revisions transition through the stages of a well-defined lifecycle.

Figure 2:
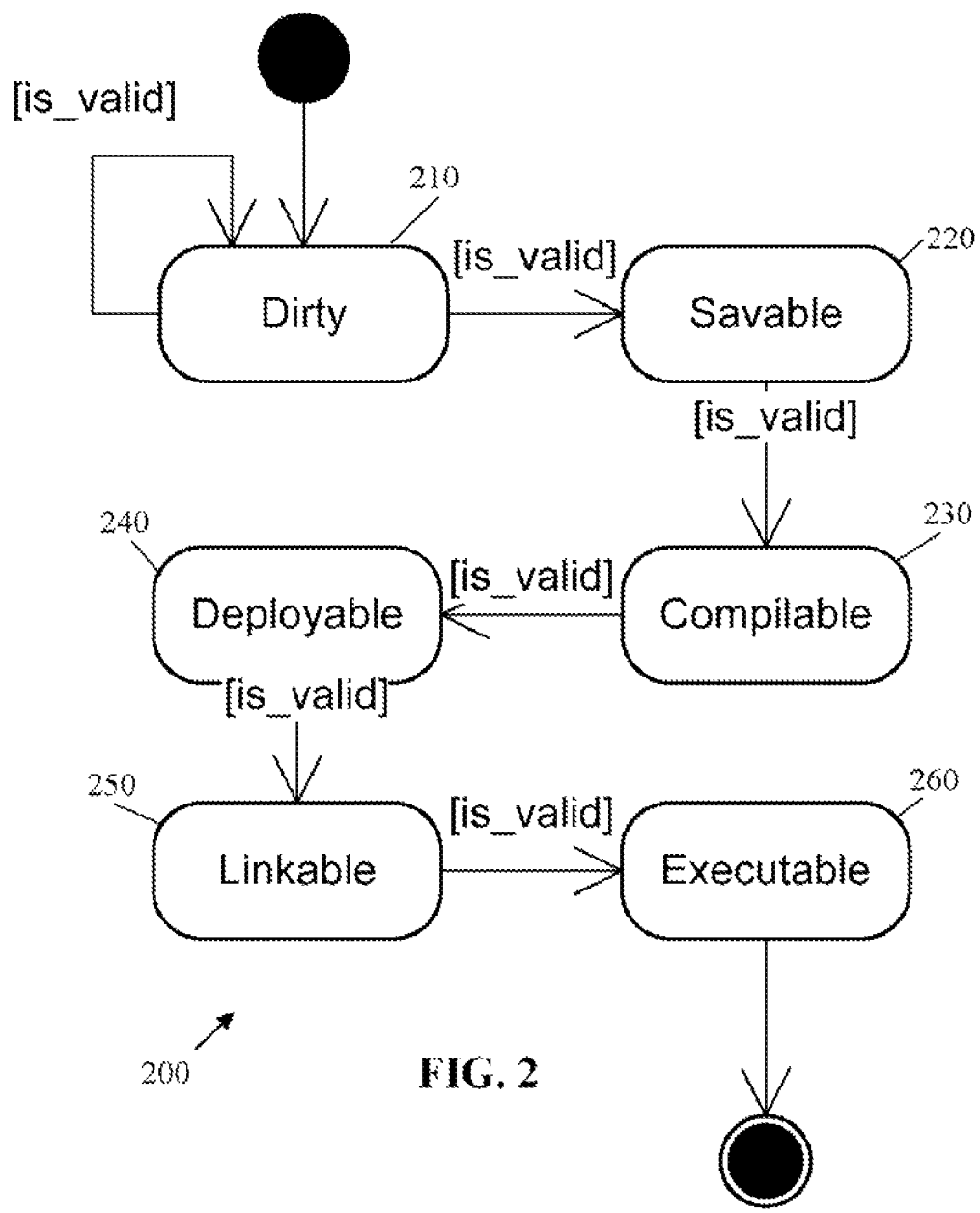
FIG. 2 is a diagram illustrating stages of a lifecycle of model development.

The lifecycle expresses levels of maturity. A model revision matures—i.e. is specified ever more completely—as it moves through the stages. It finally reaches the state of being executable. One can associate a capacity with each stage, i.e. what actions may be performed on the revision at that point in time. FIG. 2 is a diagram 200 that illustrates the stages of the model lifecycle which can include, for example, whether the software deployment is in an inconsistent state (e.g., dirty, etc.) 210, savable 220, compilable 230, deployable 240, linkable 250, and executable 260. Model checking can be conducted at some or all of these stages.

With regard to FIG. 2, the following are definitions of the various stages. Dirty (210): the model has been modified but changes have not yet been persisted and the model is potentially inconsistent in terms of structure (which could prevent persistence because of data inconsistency). Savable (220): The model is structurally sound and can be persisted. Compilable (230): The model satisfies all previous criteria and is consistent so that is can be transformed into a lower level execution language. Deployable (240): The model satisfies all previous criteria and all compiled artifacts and configuration settings are ready to be deployed into a runtime environment. Linkable (250): The model satisfies all previous criteria and deployed artifacts can be linked together to form an executable entity. Executable (260): The model satisfies all previous criteria and execution can be initiated at any point in time.

Revisions need to pass checkpoints when moving from one stage to the other. In case a revision does not satisfy the set of checks of particular checkpoint, it is rejected and remains in its current stage. Table 3 lists example checkpoints that a model revision passes.

TABLE 3

Model Revision Checkpoints

| Checkpoint | Effect of Errors |
| --- | --- |
| While editing | The current change is rejected, i.e. the model does not transition into the Dirty state. Effectively the last edit action that triggered the transition is rejected. Example. Inserting a metamodel element not supported in the context of a workflow. |
| Before saving | The current revision is rejected, i.e. it does not transition into the Savable state and thus cannot be saved. Example. A missing domain model element for a particular graphical element violates the consistency constraints. |
| Before compiling | The current revision is rejected, i.e. it does not transition into the Compilable state and thus cannot be compiled. Example. A model violates the correctness constraints of a domain metamodel. |
| Before linking | The current revision is rejected, i.e. it does not transition into the Linkable state and thus cannot be linked. Example. An element referenced of but not defined in a model is missing. |
| Before deploying | The current revision is rejected, i.e. it does not transition into the Deployable state and thus cannot be deployed. Example. The target environment does not support the compiled and linked model. |

TABLE 3-continued

Model Revision Checkpoints

| Checkpoint | Effect of Errors |
| --- | --- |
| Before executing | The current revision is rejected, i.e. it does not transition into the Executable state and thus cannot be executed. Example. A model violates the execution semantics of a domain. |

Checks can be associated to a domain metamodel and define constraints on one or a number of elements of that domain. The domain metamodel syntax and semantics serve as the basis for specifying constraints and assigning them to the classes described above. Each check can capture an aspect of either the syntax or semantics. In order to document this relation, the following attributes of a check can be utilized.

The domain attribute describes in what context an artifact is used and implies how the artifact is to be interpreted in that context. For example: the domain of workflow. A capability attribute is an aspect of a domain. It further restricts how an artifact is to be interpreted in the context of a domain. For example: the capability of control flow of the workflow domain. A constraint is a predicate over one or many elements of the domain metamodel. The context of the constraint is defined as the set of these elements on which the constraint is applied. A check has local scope if the context of its constraint comprises no more than one element. It has global scope if the context comprises more than exactly one element. It is advisable to perform checks with local scope prior to those with global scope. The scope attribute characterizes the scope in which a check is applied, i.e. local or global. Dependencies between checks based on the scope may exist.

TABLE 5

| Check Classification Schema | |
| --- | --- |
| Property | Description |
| Metadata | |
| Unique Identifier | Uniquely identifies a check on a global level. |
| Domain | The paradigm(s) affected by this check, e.g. workflow, business rules, business events. |
| Capability | The conceptual aspect the check covers. In case of workflow one of control-flow-related, data-flow-related, infrastructure-related (e.g. ability to deploy, availability of endpoints, and such), compliance-related. |
| Scope | Scope within which the check can be applied; either local or global. |
| Version | Metamodel version the check applies to, i.e. the version of the metamodel at the time the check was introduced (deprecated in case the check has been deactivated in the meantime). |
| Constraint Specification | |
| Class | Constraint class. |
| Severity | The severity returned in case the constraint is violated. |
| Checkpoint | The point of time in the lifecycle of the model revision a check is to be performed. |
| Dependencies | Describes additional dependencies of the check not already captured by the constraint class [optional]. |

TABLE 5-continued

Check Classification Schema

| Property | Description |
|---|---|
| Constraint | The check criteria axiomatization; returns true if and only if an artifact passes the check, otherwise false. |
| Quick Fix | One or more alternative to resole constraint violations [optional]. |

A model checking architecture can provide that checks should be defined once, portable to diverse environments, and be applicable consistently across all environments. In addition, a modeling environment should provide comprehensive support and guidance in identifying and resolving model errors. This process can be facilitated by applying the concepts outlined in the conceptual section of this document.

Figure 3:
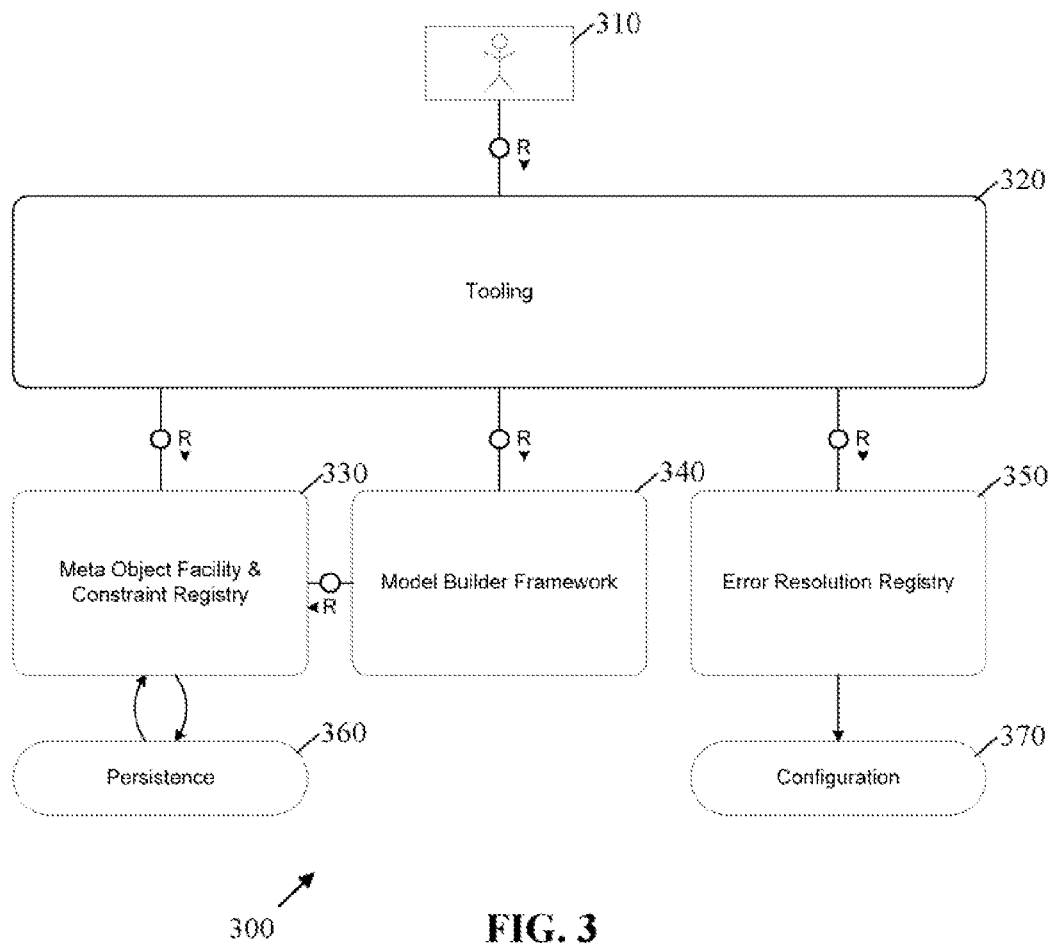
FIG. 3 is a diagram illustrating model checking architecture components.

FIG. 3 is a diagram 300 illustrating components of a model checking architecture which can include a user interface 310, a tooling component 320, a Meta Object Facility and Constraint Registry 330 (which may be coupled to a persistence mechanism 360), a Model Builder Framework 340, and an Error Resolution Registry 350 (which may be coupled to a configuration component 370). The user interface 310 provides the modeler/any end user in front of the modeling environment. The tooling component 320 provides modeling tooling, i.e. the IDE comprising all editors, views, project explorer and object inspectors required to go about the task of modeling. The Meta Object Facility and Constraint Registry 330 provides a repository that provisions metamodels, constraints and stores models. The Model Builder Framework 340 provides a configurable framework to register model builder agents against model types, e.g. register a workflow model builder that is used whenever building/compiling workflow models. The Error Resolution Registry 350 provides a configurable error resolution framework that maps encapsulated resolution strategies to constraint violations such that, when constraint violation X occurs, the registered strategies can be loaded, presented to the user and executed. The persistence mechanism 360 provides persistence for the model repository. The configuration component 370 provides the format and files in which error resolution strategies are persisted (in our case an XML based configuration file).

Prerequisites of a model checking architecture can include the ability to define the common static structure of models in a domain-specific metamodel and a model repository that stores models created according to such a metamodel. As a result, the current architecture includes a facility to create, store and retrieve models based on a domain metamodel.

Capturing constraints of model elements in a computer-readable formalism is a first step towards model checking automation. Typically, a constraint can be expressed as a predicate over the attributes or associations of one or many elements of a domain model. Such a process can be referred to as the check implementation.

Next to the formal specification of constraints, a mechanism can be required to associate a check implementations to the respective domain metamodel concept and apply it to all occurrences of that concept. Constraints are integral to model consistency so that it is not advisable to separate check implementation from metamodel definition. On the contrary, to get consistent results across models and repositories, constraint specifications can be deployed alongside metamodel definitions.

The current techniques utilize SAP Modeling Infrastructure (MOIN) which is a reference implementation of the Meta-Object Facility (MOF). The Object Management Group (OMG) proposed MOF as a standard for the Model Driven Engineering community. In particular, MOIN implements a MOF compliant repository implementation and provides comprehensive tooling to define and deploy metamodels. MOIN technology can provide a standard repository with an extensive feature set.

MOIN supports the Object Constraint Language (OCL) for the definition of inline metamodel constraints. This arrangement allows designers to capture constraints in a standardized language as part of the metamodel tooling. OCL is a formal specification language extension to the Unified Modeling Language (UML) and MOF. It allows the text-based definition of constraints on any MOF metamodel and model. OCL is capable of expressing most if not all computational problems. This obviously includes an arbitrarily complex metamodel constraint. OCL is therefore an appropriate formalism for check implementation.

The process of capturing constraints can be highly domain-specific and most metamodels will have a disjoint set of problems. As described below, a taxonomy can be used to structure and relate check implementations. Table 6 details possible mappings to MOIN as well as current limitations.

TABLE 6

Taxonomy, Possible Mappings to MOIN and Limitations

| Taxonomy Feature | Implementation in MOIN | Current Limitations |
|---|---|---|
| Checkpoint | This requirement maps to the flag uml2mof.evaluationPolicy in MOIN, although not to full extent. The evaluation policy determines whether a constraint is to be enforced immediately upon changing a model or whether the constraint evaluation is deferred, i.e. enforced after a change. | The model-life cycle proposes a more fine-grained evaluation policy. Each check is associated to a stage in the model lifecycle and will only be applied in case the model is currently in that stage. |
| Constraint class | MOIN supports the marking of constraints with a category by means of sap2mof.constraintCategory. | MOIN has no understanding of the content of the constraint class attribute. This |

TABLE 6-continued

Taxonomy, Possible Mappings to MOIN and Limitations

| Taxonomy Feature | Implementation in MOIN | Current Limitations |
|---|---|---|
| | This feature can be used to assign a constraint class identifier to each constraint. | information can be process by the application. |

Model-driven engineering deals with the high-level specification of a system as an abstract model. A well-structured, sound model in turn is the starting point for the automated production of a program that can be run by a computer. The process of reducing the high-level specification into executable code can be referred to as building a model. This process consists of at least two steps: input validation on the one hand; the transformation or compilation of a source model into a target model on the other hand. In some implementations, the sequence of steps that are part of building a model can include input validation->transformation->optimization->output validation.

Model checking is concerned with the validation of the input, i.e. the source model, and if required the output, i.e. the target model. The former can consist of enforcing constraints specified as part of the source metamodel, the latter of enforcing constraints defined for the target metamodel as outlined below.

An Integrated Development Environments (IDE) is a useful tool for the development, building and testing of developments components. This includes but is not limited to conceptual models. One example of modeling integration into a modem IDE is the Eclipse Modeling Framework. A development component typically contains a number of interconnected artifacts. Accordingly, the complete dependency graph of objects needs to be built to obtain a consistent build result. Furthermore, development components may share objects and may reference each other.

As an effect, a modeling checking infrastructure integrated into a model build needs to be able to validate a large number of models upon request. Strategy for prioritizing and filtering checks which are applicable at a given model checkpoint are provided herein. This strategy may be used to optimize and accelerate the process of model validation. Given a checkpoint contained in the set of reachable checkpoints of a model $c \in C$, one can determine the set of constraints $S_C$ registered for c.

Reduce $S_C$ to a set $S_1 \subset S_C$ that contains constraints, which can be locally applied. Constraints in $S_C$ share the attribute that each is defined for exactly one model element. If one such constraint is violated, it will affect the result of evaluating constraints that take into account several elements at the same time. Accordingly, priority can be given to "local" constraints.

Figure 4:
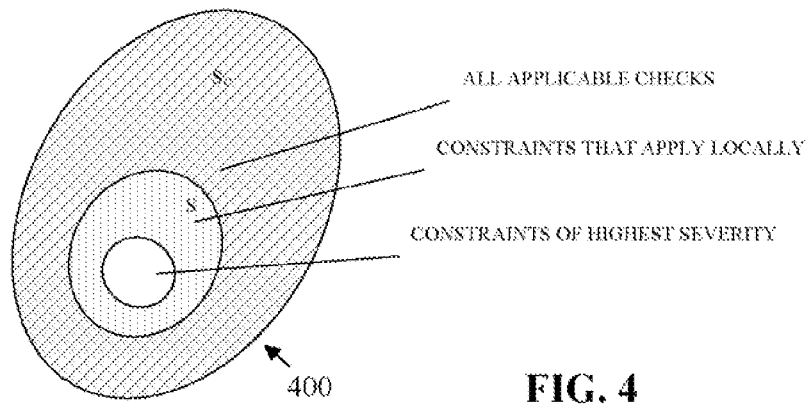
FIG. 4 is a Venn diagram illustration prioritization of checks.

Reduce $S_1$ further to a set $S_s \subset S_1$ which contains only "local" constraints that have the highest impact. This attribute is expressed by the severity of the constraints. As provided above, a severity of Error disqualifies the model to transition to the next lifecycle stage. The build would accordingly have to fail. Finally, apply constraints in the sets $S_s$, then $S_1-S_s$, then $S_C-S_1$ in precisely that order. FIG. 4 is a Venn diagram 400 illustrating a hierarchy of such constraints.

In addition to an optimization algorithm, a model checking architecture can provide comprehensible error reporting. The prioritization of checks will put users in a position to focus on remedying the most urgent errors first. The approach also gives lower precedence to errors resulting from other errors and thus avoids distracting users from fixing the root cause. Such results can be intelligently displayed to allow user attention to be selectively guided. One approach is to use an IDE user interface design that display errors in a tabular layout. Additionally, users may be able to filter, reorder and tailor error lists to their preferences.

Another important aspect of error reporting can be readability of the error descriptions. For each constraint it can be assumed that there exists an error description associated to that constraint. The error should be attached to the constraint, just as the constraint is attached to a particular element of the domain metamodel. Obviously, an error message must not confuse, but assist the user in identifying and resolving the issue.

On one hand, error text should be internationalized and rendered in the native language of the user (this can be referred to as internationalization of constraint error descriptions). On the other hand, text should be contextualized, i.e. contain specific information about incorrect elements, attributes and other useful hints. The latter can be achieved by means of parameterized text, i.e. text that contains markers. Such markers are bound to expressions that resolve to concrete values at runtime. By way of example, a text template "Element % name % contains errors" could resolve to "Element element1 contains errors".

The NetWeaver Development Studio (NWDS) is an example IDE that can be used to implement requirements described herein. NWDS builds on the Eclipse platform, an open source, extensible platform for the creation of development environments. In addition, the project MOIN in Eclipse (MIE) provides tooling for the integration of Eclipse and MOIN which aligns with MOIN as the repository. NWDS introduces the concept of development components (DC) for the structuring and layering of development projects. When creating a development component, one can assign one or many types to it to specify the types of resources it may contain. This assignment includes but is not limited to models created using MOIN.

As the model checking requirements for each type of resource may differ, a flexible way to register different mechanisms that perform model validation can be provided. The Eclipse platform provides a framework for the development of so-called project builders. A project builder scans the resources contained within a project and determines the delta of resources that have changed since the last build. In subsequent steps, it can validate and compile the affected resources. This framework can be extended to implement the requirements outlined above.

For a development component that is marked with the type MOIN, a model checking agent implemented as a project builder can be registered. The agent will determine the delta of affected MOIN models and identify the matching checkpoint for each model. Depending on the checkpoint, the agent can load and filter the set of applicable constraints as per the algorithm introduced above.

TABLE 7

Supported Checkpoints

| Checkpoint | Description |
| --- | --- |
| Before deploying | It can be assumed that a project build will result in deployable execution model. Accordingly, in some variations, other checkpoints are not supported. |

MIE defines extensions to the error marking concept of Eclipse. By means of a programming interface, so-called error markers can be created. During a build run, the model builder may invoke this interface to create a marker for each constraint violation it has identified. When creating a marker, it will set the following attributes: the identifier of the constraint that was violated as well as the type and name of the violating model element. Furthermore, it will load the error text associated to the constraint, resolve it (in case it contains parameters) and set it as the marker description. The Eclipse platform provides a view for displaying, filtering and organizing markers, the problem view. Creating markers by means of the MIE interface automatically populates this view, rendering the marker descriptions in a table.

Requirements of provisioning error resolution strategies are described below from two perspectives: that of the user and that of the tool developer. The user requires assistance and tooling support to apply the strategy. The tool developer requires an implementation strategy and a mechanism to register strategy implementations for particular constraint violations.

The current subject matter assist users in dealing with constraint violations by providing automated resolution strategies. Oftentimes, a multitude of different resolution strategies exists and may be offered. By way of example, a constraint might prevent a software package from having classes with the same name. However, during local updates or other external events two classes with the same name could be assigned the same package. This violation has multiple resolution strategies:

Delete the first class
Delete the second class
Rename the first class
Rename the second class
Move any of the classes to a different package Not all possible resolutions might make sense in a concrete context so a useful resolution set might be:

Rename the first class
Rename the second class
Create new package and assign first or second class Offering resolution strategies to the user can be based on user interaction in form of dialogs or wizards. Even if no interaction is necessary it is desirable to inform the user what action or resolution strategy was performed.

The tool developer's responsibility is to define these resolution strategies and associate them with given violation identifiers. Note that a concrete resolution strategy might be associated with several violation identifiers. During the check implementation phase, the check designer might propose several resolution alternatives and document them as part of the constraint specification.

During tool development, the tool developer would realize these alternatives as encapsulated commands that perform basic actions on the model. This typically includes the modification, insertion or deletion of elements and their attributes. As an effect of applying the command, the model should transition into a consistent state.

Eclipse provides mechanisms to associate the marker types with error resolution implementations. This framework assumes that each marker type represents a class of model inconsistencies. In case of OCL constraints only one marker type for OCL constraint violations exists. The concrete violation identifier is part of the marker itself. The current subject matter provides an additional framework on top of Eclipse that allows for violation identifiers to be associated with resolution implementation.

The advantage over—and difference to—the Eclipse framework is that only one marker type is used and not one marker type per violation. In case of the MOF standard this would result in more than 60 marker types (following the Eclipse implementation) as opposed to only one marker type (using the MIE implementation).

In addition, MOIN supports an encapsulation concept called command. A command comprises several atomic actions on one or more model elements. It is furthermore embedded into an undo-redo stack. Thus, actions that are performed on the model can be undone by the user. This greatly facilitates the development of resolution strategies. Extra support for the registration of commands as resolution alternatives for a given constraint can also be provided.

Figure 5:
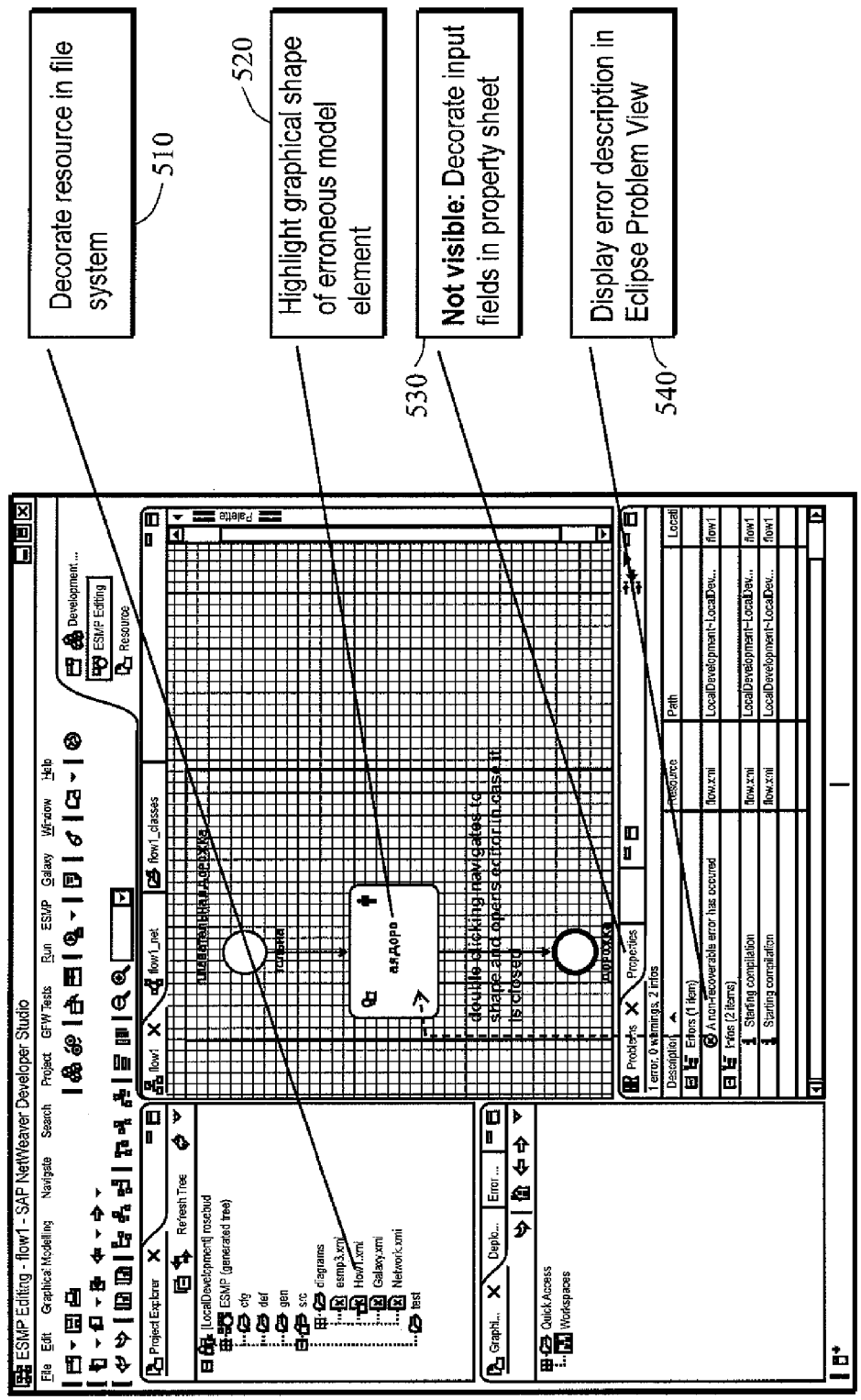
FIG. 5 is a first screen shot of an integrated development environment.

The current architecture provides several extensible mechanisms to track down and resolve issues. A model checker can be integrated with the Eclipse builder feature and populates the problem view with markers. FIG. 5 is a screenshot 500 of an integrated development environment. It consists of a central editor area, a navigation pane to the left and an inspector pane below. The navigation pane hosts the project navigator, which shows the repository structure as a tree. Below is an outline view, which in turn shows the structure of a single diagram/model. The inspector pane hosts the problem view, which displays errors of models in a common development project/package. Such a view can be filtered. A resource in file system is decorated 510 and an erroneously placed model element is highlighted 520. Double-clicking on the erroneously placed model element causes an error description to be shown in an Eclipse Problem View 540 (and also allows input fields to be decorated on a property sheet 530).

Figure 6:
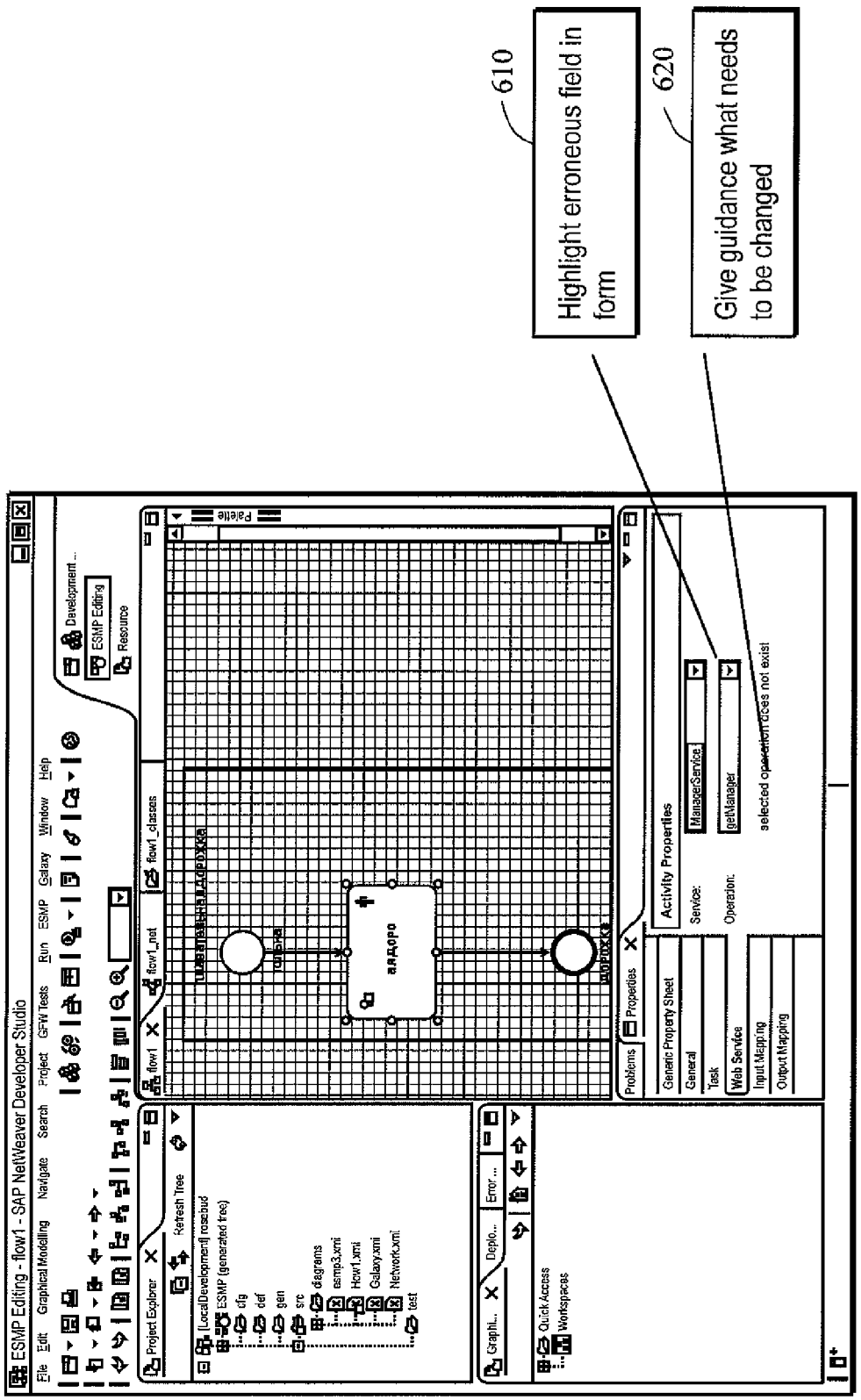
FIG. 6 is a second screen shot of an integrated development environment.

Color-coding erroneous entries makes it easy for the user to identify issues. Textual annotations provide guidelines on the type of issue and strategies for its resolution. FIG. 6 is a screenshot 600 in which an erroneous field is highlighted 610 in a form so that guidance 620 may be conveyed to a user to indicate what needs to be changed. This screenshot 600 shows the property sheet, which lets the modeler inspect the properties of a selected modeling element. It highlights errors and gives guidance on how to fix the error.

Figure 7:
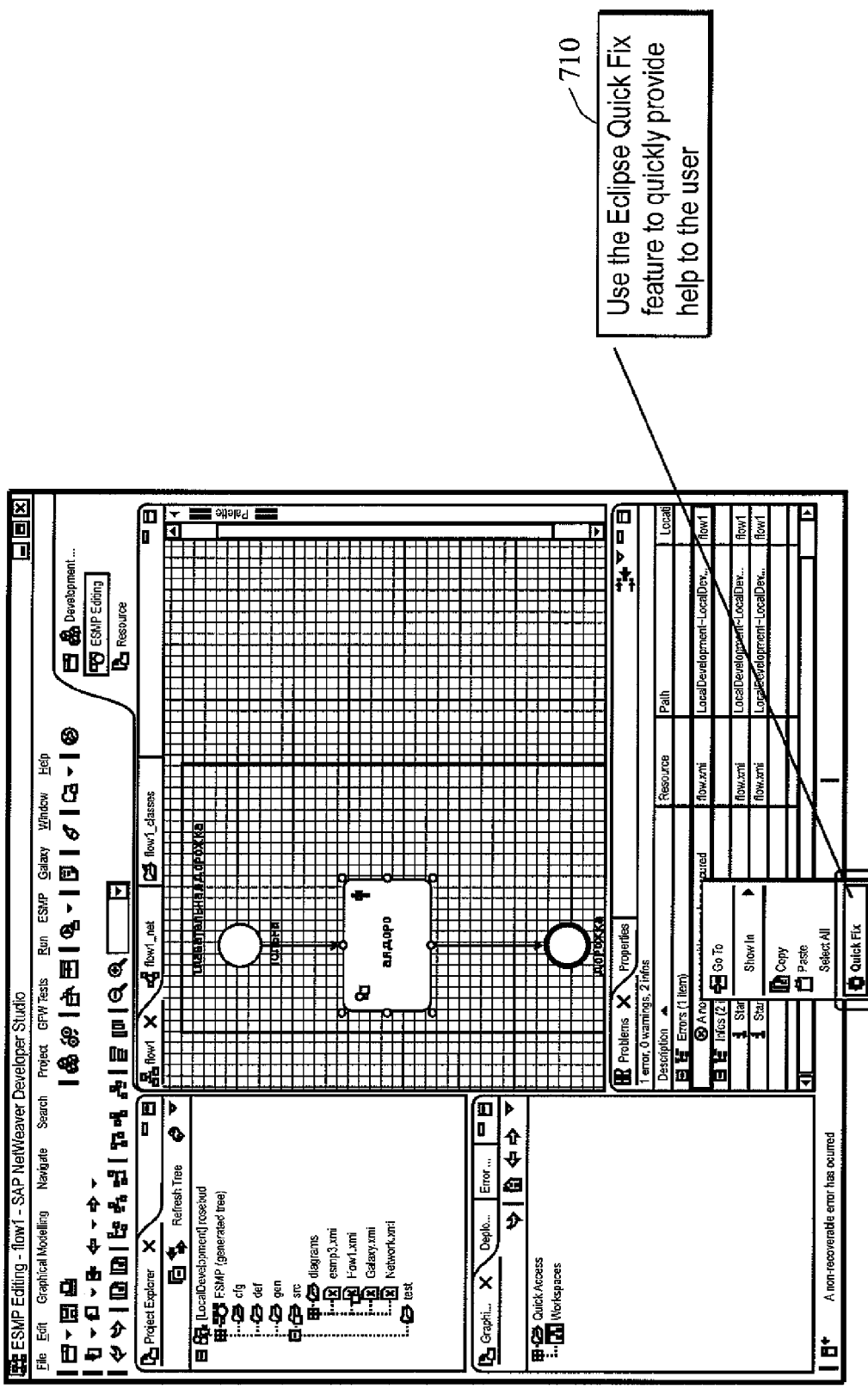
FIG. 7 is a third screen shot of an integrated development environment.

If possible, quick fix strategies may be provided to the user. He or she may choose one of the available strategies to resolve the issue (see FIG. 7 which illustrates a screenshot 700 in which the Eclipse Quick Fix mechanism 710 is utilized to provide help to a user). This can seamlessly integrate with the Eclipse quick fix feature. This screenshot shows the integration of encapsulated error resolution strategies into the Eclipse problem view (displaying errors in a tabular fashion) and the quick fix menu (that indicates whether a fix is available). The user goes about this as follows: scan the list, select an error to be fixed.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein provides many advantages. For example, by distributing at least a portion of a scoring model to remote data sources, the amount of data transmitted from such data sources is significantly compressed. This compression reduces communication bandwidth consumption while leveraging the data sources' own processing resources to perform a significant fraction of the calculations need to turn their raw data into a model score. Moreover, the subject matter described herein is advantageous in that it can be used with a wide variety of scoring techniques using variables including, for example, scorecards, neural networks, support vector machines, and more.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable medium embodying instructions that when performed by one or more machines result in operations comprising:
   identifying a plurality of constraints for a model of a software deployment in an integrated development environment;
   associating each of the constraints with one of a plurality of analysis levels;
   determining, for each analysis level, whether the corresponding associated constraints are met; and
   identifying the model as having met the constraints if it is determined that the corresponding associated constraints are met for each analysis level;
   wherein the analysis levels are selected from a group consisting of: syntactical analysis, static semantic analysis, dynamic semantic analysis, plausibility analysis, and conceptual analysis.

2. The article as in claim 1, wherein the article further embodies instructions that when performed by one or more machines result in operations comprising:
   identifying the model as not having met the constraints if it is determined that at least one of the corresponding associated constraints is not met for each analysis level.

3. The article as in claim 2, wherein the article further embodies instructions that when performed by one or more machines result in operations comprising:
   identifying each analysis level in which at least one of the corresponding associated constraints is not met.

4. The as in claim 3, wherein the article further embodies instructions that when performed by one or more machines result in operations comprising:
   identifying the constraints that are not met.

5. The as in claim 4, wherein the article further embodies instructions that when performed by one or more machines result in operations comprising:
   associating the constraints that are not met with constraint violation severity levels; and
   identifying the associated constraint violation severity level.

6. The as in claim 4, wherein the article further embodies instructions that when performed by one or more machines result in operations comprising:
   providing a visual representation suggesting a resolution to allow the constraint to be met.

7. The article as in claim 1, wherein the determination whether the corresponding associated constraints are met for each analysis level are initiated when a model revision checkpoint occurs.

8. The article as in claim 7, wherein the checkpoint is associated with a transition from a first model state to a second model state.

9. The as in claim 1, wherein the constraints define constraints of one or more elements of a domain metamodel.

10. The article as in claim 1, wherein the constraints are applied to specific aspects of a model and are associated with certain points of time in a lifecycle of the model, and the analysis levels are used to distinguish the specific aspects of the model.

11. A method for implementation by one or more data processors comprising:
    identifying, by at least one data processor, a plurality of constraints for a model of a software deployment in an integrated development environment;
    associating, by at least one data processor, each of the constraints with one of a plurality of analysis levels;
    determining, by at least one data processor for each analysis level, whether the corresponding associated constraints are met; and
    identifying, by at least one data processor, the model as having met the constraints if it is determined that the corresponding associated constraints are met for each analysis level;
    wherein the determination whether the corresponding associated constraints are met for each analysis level are initiated when a model revision checkpoint occurs.

12. The method as in claim 11 further comprising:
identifying, by at least one data processor, the model as not having met the constraints if it is determined that at least one of the corresponding associated constraints is not met for each analysis level.

13. The method as in claim 12 further comprising:
identifying, by at least one data processor, each analysis level in which at least one of the corresponding associated constraints is not met.

14. The method as in claim 13, wherein the article further embodies instructions that when performed by one or more machines result in operations comprising:
identifying, by at least one data processor, the constraints that are not met.

15. The method as in claim 14, wherein the article further embodies instructions that when performed by one or more machines result in operations comprising:
associating, by at least one data processor, the constraints that are not met with constraint violation severity levels; and
identifying, by at least one data processor, the associated constraint violation severity level.

16. The method as in claim 14 further comprising:
providing, by at least one data processor, a visual representation suggesting a resolution to allow the constraint to be met.

17. The method as in claim 11, wherein the analysis levels are selected from a group comprising: syntactical analysis, static semantic analysis, dynamic semantic analysis, plausibility analysis, and conceptual analysis.

18. The method as in claim 11, wherein the checkpoint is associated with a transition from a first model state to a second model state.

19. The method as in claim 11, wherein the constraints define constraints of one or more elements of a domain meta-model.

20. An article comprising a non-transitory machine-readable medium embodying instructions that when performed by one or more machines result in operations comprising:
identifying, by at least one data processor, a plurality of constraints for a model of a software deployment in an integrated development environment;
associating, by at least one data processor, each of the constraints with one of a plurality of analysis levels;
determining, by at least one data processor for each analysis level, whether the corresponding associated constraints are met; and
identifying, by at least one data processor, the model as having met the constraints if it is determined that the corresponding associated constraints are met for each analysis level;
wherein the determination whether the corresponding associated constraints are met for each analysis level are initiated when a model revision checkpoint occurs.

* * * * *